C. HOWARD.
Horse Hay-Rake.

2 Sheets—Sheet 1.

No. 99,319.

Patented Feb. 1, 1870.

Witnesses:
J. W. Master
H. A. Daniels

Inventor:
Chas Howard by
L A Whitman
Attorney of Washington DC

C. HOWARD.
Horse Hay-Rake.

No. 99,319.

2 Sheets—Sheet 2.

Patented Feb. 1, 1870.

Witnesses:
J. H. Meeter
H. A. Daniels

Inventor:
Chas. Howard by Attorney
G. S. Whitman at Washington DC

United States Patent Office.

CHARLES HOWARD, OF WEST HURLEY, NEW YORK.

Letters Patent No. 99,319, dated February 1, 1870.

IMPROVEMENT IN HORSE HAY-RAKES.

The Schedule referred to in these Letters Patent and making part of the same.

*To all whom it may concern:*

Be it known that I, CHARLES HOWARD, of West Hurley, in the county of Ulster, and in the State of New York, have invented a new and useful Improvement in Horse-Rakes; and do hereby declare that the following description, taken in connection with the accompanying plate of drawings, hereinafter referred to, forms a full and exact specification of the same, wherein I have set forth the nature and principles of my said improvement, by which my invention may be distinguished from others of a similar class, together with such parts as I claim, and desire to secure by Letters Patent.

My invention relates to that class of horse-rakes known as revolving-rakes; and

Its nature consists in certain important modifications in the details of the same, whereby the rake-head may be guided, adjusted, and rotated, with the greatest facility, to wit: In providing the handle with an adjustable brace, by means of which the front row of the teeth is held in a slightly elevated position, in order to avoid obstructions when the rake is not in operation, or is being transported from field to field; and in making the rake-head entirely subject to the will of the operator, by means of the cams, stops, and actuating-lever, arranged and operated in the manner hereinafter more fully set forth.

In the accompanying plates of drawings, which illustrate my invention, and form a part of the specification thereof, and in which corresponding parts are represented by similar letters—

Figure 1:
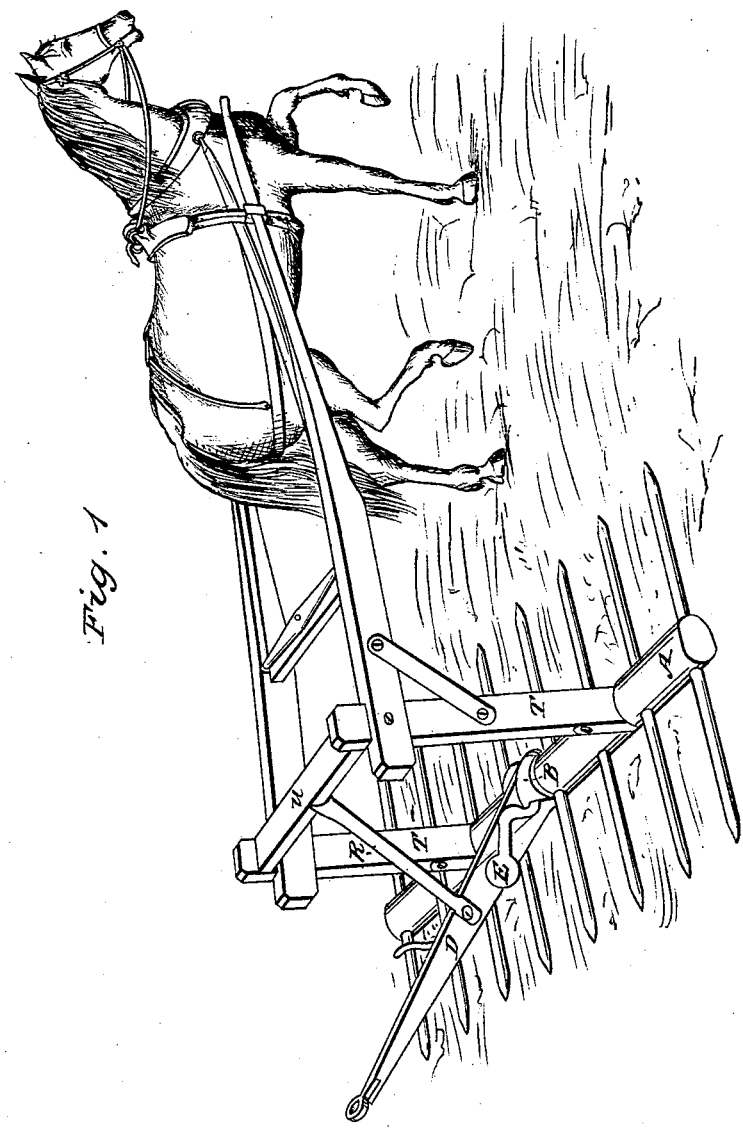
Figure 2:
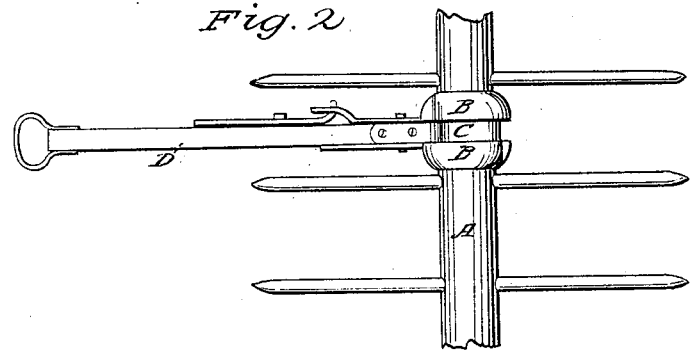
Figure 3:
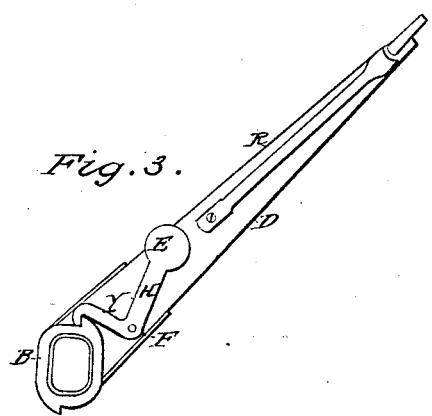
Figure 4:
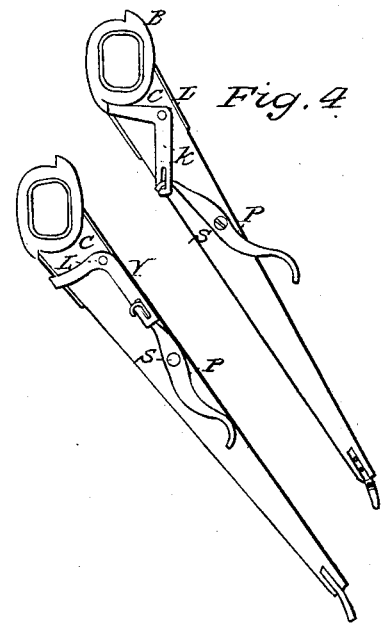

Figure 1 is a perspective view of a revolving horse-rake, with my invention applied thereto; and Figures 2, 3, and 4, show, more in detail, the position of the collars, with the cams thereon, and also the stops, brace, and operating-lever.

The construction of my invention, and arrangement of the devices constituting the same, is as follows, to wit:

The rake-head A is of the usual form, and is provided with a double row of teeth, pointing in opposite directions, in the ordinary manner.

At the centre of the head are fitted and secured the collars B, which are provided with the cams or wipers *b*. The said collars are of oval form, and of sufficient breadth to serve as a shoe or runner, supporting the implement as it passes over the ground.

They are connected by a short cylindrical shaft or journal, which has its bearings in a circular perforation cut in the larger end *c* of the handle D.

On the right-hand side of the handle D is the bell-crank H, which vibrates upon a fixed pivot, F, and is provided with the weight E, whose gravity prevents it from revolving, and causes the pawl or tappet I to press continuously against the collar B, and catch in the nicks or notches cut upon the same for its reception.

Upon the left-hand side of the handle D, the bell-crank K vibrates upon the fixed pivot L.

The rear limb of the said bell-crank is provided with an oblong perforation, for the reception of the bent end of the operating-lever P, which revolves upon a fixed pivot.

The brace R is pivoted to the said handle, by a bolt or screw, *s*, in such a manner that it may be revolved freely about the same.

The said rake-head revolves in circular perforations at the lower ends of the upright standards T, at the right angles with which the thills are attached.

The said standards are connected and held in position by the cross-bar *u*.

The operation of the invention is as follows, to wit:

The rake-head A, with its double row of teeth, is kept flat upon the ground, and secured firmly in position by means of the bell-cranks H and L; the pawl of the bell-crank L catches above the tooth, and in the nick or notch which is cut upon the collar, to the left of the operator, and the tappet of the bell-crank E, below the tooth, and in the notch cut upon the collar at the right of the operator, thus holding the said rake-head rigidly in its place, and preventing it from revolving in either direction.

In order to unload the rake, when a sufficient quantity of hay is collected, the handle is raised by the operator, until the actuating-lever P comes in contact with the cross-bar *u*. The percussion of the contact disengages the tappet upon the bell-crank L from the nick in the collar B, causing the rake-head to revolve, and throwing the rear teeth foremost over the windrow formed by the discharged hay, and thus unloading the rake by a single motion of the hand, without lifting the same, or stopping the horse.

While the rake-head is being thus revolved, the pawls upon the bell-cranks H and L press constantly against the convex surface of the collars, and, when the rake-head has made a semi-revolution, catch in nicks upon, and lock the rake-head in position.

In transporting the rake, when not in operation, the forward teeth are slightly elevated, in order to avoid obstructions, and held in position, when thus raised, by means of the brace R, which is revolved until the upper end of the same comes in contact with the cross-piece *u*.

Having thus described the nature, construction, and operation of my invention, I will proceed to indicate what I claim as new, and desire to secure by Letters Patent, in the following clause, to wit:

The combination and arrangement of the handle D, lever P, bell-crank L, and cross-bar *u*, standards T, rake-head A, and brace R, as herein described and shown.

In testimony that I claim the foregoing, I have hereunto set my hand, this    day of    , 1869.

CHARLES HOWARD.

Witnesses:
J. W. MISTER,
H. A. DANIELS.